United States Patent
Anderson (10) Patent No.: US 9,183,591 B2
(45) Date of Patent: *Nov. 10, 2015

(54) VIRTUAL ACCOUNTS LINKED TO FINANCIAL ACCOUNTS

(75) Inventor: Erik D. Anderson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/599,285

(22) Filed: Aug. 30, 2012

(65) Prior Publication Data

US 2012/0330826 A1    Dec. 27, 2012

Related U.S. Application Data

(63) Continuation of application No. 13/077,917, filed on Mar. 31, 2011, now Pat. No. 8,266,058.

(51) Int. Cl.
| | |
|---|---|
| *G06Q 40/00* | (2012.01) |
| *G06Q 40/02* | (2012.01) |
| *G06Q 20/34* | (2012.01) |
| *G06Q 20/38* | (2012.01) |
| *G06Q 20/40* | (2012.01) |

(52) U.S. Cl.
CPC .............. *G06Q 40/02* (2013.01); *G06Q 20/351* (2013.01); *G06Q 20/385* (2013.01); *G06Q 20/405* (2013.01)

(58) Field of Classification Search
CPC ....... G06Q 10/00; G06Q 20/00; G06Q 30/00; G06Q 40/00
USPC ....................................................... 705/3–44
See application file for complete search history.

(56) References Cited

U.S. PATENT DOCUMENTS

| | | | |
|---|---|---|---|
| 6,704,714 B1 * | 3/2004 | O'Leary et al. | 705/39 |
| 7,204,412 B2 * | 4/2007 | Foss, Jr. | 235/380 |
| 7,318,049 B2 | 1/2008 | Iannacci | |
| 7,584,153 B2 | 9/2009 | Brown | |
| 7,890,419 B2 * | 2/2011 | Jung et al. | 705/38 |
| 7,945,512 B2 * | 5/2011 | Scipioni et al. | 705/39 |
| 7,958,047 B2 * | 6/2011 | Jung et al. | 705/38 |
| 7,991,691 B2 * | 8/2011 | Jung et al. | 705/39 |

(Continued)

OTHER PUBLICATIONS

"Virtual Bank Account," Internet web site http://www.users.globalnet.co.uk/~rxv/business/soddit.htm, Nov. 12, 1999.

(Continued)

*Primary Examiner* — Frantzy Poinvil
(74) *Attorney, Agent, or Firm* — Feb Cabrasawan (57) ABSTRACT

Virtual accounts having alphanumeric identifiers different from an alphanumeric identifier of a financial account are linked to the financial account. Financial transactions performed in relation to the virtual accounts result in changing the current value of the financial account. The virtual accounts themselves do not have a current value apart from a current value of the financial account to which the virtual accounts are linked. Performance of the financial transactions in relation to the virtual accounts does not expose the alphanumeric identifier of the financial account that would otherwise be exposed if the financial transactions were performed in relation to the financial account. A given financial account is also linked to another financial account. Performance of a financial transaction in relation to this given virtual account thus results in changing the current value of one of the financial accounts to which it is linked.

20 Claims, 4 Drawing Sheets

(56) References Cited

U.S. PATENT DOCUMENTS

| | | | |
|---|---|---|---|
| 8,175,968 B2* | 5/2012 | O'Leary et al. | 705/39 |
| 8,249,985 B2* | 8/2012 | Giordano et al. | 705/39 |
| 8,249,986 B2* | 8/2012 | Scipioni et al. | 705/39 |
| 8,266,058 B1 | 9/2012 | Anderson | |
| 8,285,638 B2* | 10/2012 | Jung et al. | 705/39 |
| 8,332,310 B2* | 12/2012 | Royer et al. | 705/38 |
| 8,348,158 B2* | 1/2013 | Hogg et al. | 235/380 |
| 8,401,962 B1* | 3/2013 | Bent et al. | 705/39 |
| 8,433,652 B2* | 4/2013 | O'Leary et al. | 705/39 |
| 8,457,991 B2* | 6/2013 | Jung et al. | 705/4 |
| 8,458,016 B1* | 6/2013 | Medina et al. | 705/14.31 |
| 2006/0195377 A1 | 8/2006 | Jung | |
| 2006/0229976 A1 | 10/2006 | Jung | |
| 2007/0185820 A1 | 8/2007 | Talker | |
| 2008/0169344 A1 | 7/2008 | Huh | |
| 2009/0144193 A1* | 6/2009 | Giordano et al. | 705/39 |
| 2010/0100461 A1 | 4/2010 | Laing | |
| 2010/0211445 A1 | 8/2010 | Bodington | |
| 2010/0223167 A1* | 9/2010 | Jung et al. | 705/30 |
| 2010/0312704 A1 | 12/2010 | Rohatgi | |
| 2011/0010292 A1* | 1/2011 | Giordano et al. | 705/39 |
| 2012/0254033 A1 | 10/2012 | Anderson | |
| 2013/0238487 A1* | 9/2013 | Biske | 705/39 |

OTHER PUBLICATIONS

Notice of allowance for U.S. Appl. No. 13/077,917 dated May 8, 2012, 9 pp.

* cited by examiner

VIRTUAL ACCOUNTS LINKED TO FINANCIAL ACCOUNTS

RELATED APPLICATIONS

The present patent application is a continuation of the presently pending patent application of the same title filed on Mar. 31, 2011, and assigned application Ser. No. 13/077,917.

BACKGROUND

Financial accounts are the lifeblood of many consumers, including people, businesses, and so on. Consumers have a wide variety of different financial accounts from which to choose. Banking accounts, held at institutions like banks, credit unions, and so on, include checking accounts, savings accounts, money market accounts, investment accounts, and other types of accounts. Card-oriented accounts include credit card accounts, charge card accounts, debit card accounts, and other types of accounts.

SUMMARY

A computer-readable data storage medium of an embodiment of the invention stores a computer program that is executable by a processor. Execution of the computer program by the processor causes a method to be performed. The method includes receiving an alphanumeric identifier of a financial account having a current value. The method includes generating virtual accounts. Each virtual account has an alphanumeric identifier different from the alphanumeric identifier of the financial account. The method includes linking the virtual accounts to the financial account, such that financial transactions performed in relation to the virtual accounts result in changing the current value of the financial account. The virtual accounts themselves do not have a current value apart from the current value of the financial account to which the virtual accounts are linked. Performance of the financial transactions in relation to the virtual accounts does not expose the alphanumeric identifier of the financial account that would otherwise be exposed if the financial transactions were performed in relation to the financial account. At least one virtual account has an account type identical to an account type of the financial account, and at least one other virtual account has an account type different than the account type of the financial account.

A method of an embodiment of the invention includes receiving, by a processor, an attempt to perform a financial transaction in relation to an account. The method includes the following in response to determining that the account is a virtual account linked to a first financial account having a current value and to a second financial account having a current value. The processor selects a selected financial account from at least the first financial account and the second financial account based on the financial transaction. The processor changes the current value of the selected financial account to effectuate performance of the financial transaction. The virtual account itself does not have a current value apart from the current value of the first financial account and the current value of the second financial account to which the virtual account is linked. Performance of the financial transaction in relation to the virtual account does not expose an alphanumeric identifier of the selected financial account that would otherwise be exposed if the financial transaction were performed in relation to the selected financial account. The virtual account has an alphanumeric identifier different than the alphanumeric identifier of the selected financial account.

A system of an embodiment of the invention includes a processor and a computer-readable data storage medium. The computer-readable data storage medium stores a computer program that is executable by the processor to perform the following. An alphanumeric identifier of a financial account having a current value is received. Virtual accounts are generated. Each virtual account has an alphanumeric identifier different from the alphanumeric identifier of the financial account. The virtual accounts are linked to the financial account, such that financial transactions performed in relation to the virtual accounts result in changing the current value of the financial account. The virtual accounts themselves do not have a current value apart from the current value of the financial account to which the virtual accounts are linked. Performance of the financial transactions in relation to the virtual accounts does not expose the alphanumeric identifier of the financial account that would otherwise be exposed if the financial transactions were performed in relation to the financial account. At least one virtual account has an account type identical to an account type of the financial account, and at least one other virtual account has an account type different than the account type of the financial account.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, financial accounts, such as banking accounts and card-oriented accounts, are the lifeblood of many consumers. Furthermore, with the widespread acceptance of electronic payment and deposit, many consumers choose to have many financial transactions performed electronically in lieu of using cash and paper checks. For example, rather than paying for goods and services using cash or paper checks, many consumers use credit cards. As another example, rather than receiving payment via cash or paper checks, many consumers provide their checking account information to a payor to receive payment electronically. For instance, a landlord may receive rent monies from tenants each month by having the tenants directly transfer money to the landlord's checking account, instead of writing a paper check.

However, with the increased utilization of financial accounts, particularly in an electronic manner, potential for fraud arises to the detriment of consumers. A consumer who pays via debit card may have the account number and personal-identification number (PIN) surreptitiously intercepted, or "skimmed," for nefarious gains. The interloper may create a counterfeit card with this information, and use the counterfeit card to purchase items that are paid for out of the checking account to which the consumer's debit card is linked. As another example, a landlord who provides the routing number and account number of his or her checking account so that tenants can pay their rent electronically may find that a malicious tenant is able to use this information to withdraw money from the landlord's checking account.

Embodiments of the invention thus provide for ways that can overcome these disadvantages. A virtual account that has an alphanumeric identifier, such as an account number, different than an alphanumeric identifier of a financial account is generated and linked to the financial account. Financial transactions performed in relation to the virtual accounts cause money to be withdrawn or added to the financial account itself; the virtual accounts themselves do not have their own separate monetary balances. Performance of the financial transactions in relation to the virtual accounts further does not expose the alphanumeric identifier of the financial account that would otherwise normally be exposed if the financial transactions were performed directly in relation to the financial account itself.

Furthermore, limits can be associated with the virtual accounts in some embodiments of the invention. A transaction that is attempted to be performed against a virtual account is declined if any of the virtual account's limits are violated. For instance, one limit may specify a daily or per-transaction maximum amount of money that can be withdrawn from the financial account to which the virtual account is linked, so that if the virtual account information is compromised, a malicious person will be unable to steal much money from the financial account. As another example, a limit may specify that a virtual account can be used solely to deposit money into the financial account to which the virtual account is linked, and not to withdraw money from the financial account.

In addition, a virtual account may be linked to more than one financial account in some embodiments of the invention. Rules may be specified for the virtual account, which dictate which financial account should be used to perform a transaction proffered in relation to the virtual account. For instance, one rule may specify that transactions that are less than a predetermined amount are to be processed in relation to a checking account, whereas another rule may specify that transactions that are greater than this amount are to be processed in relation to a credit card account. As such, the same virtual account can be used for transactions, but the transactions can in actuality be processed in relation to different financial accounts to which this virtual account is linked.

Figure 1:
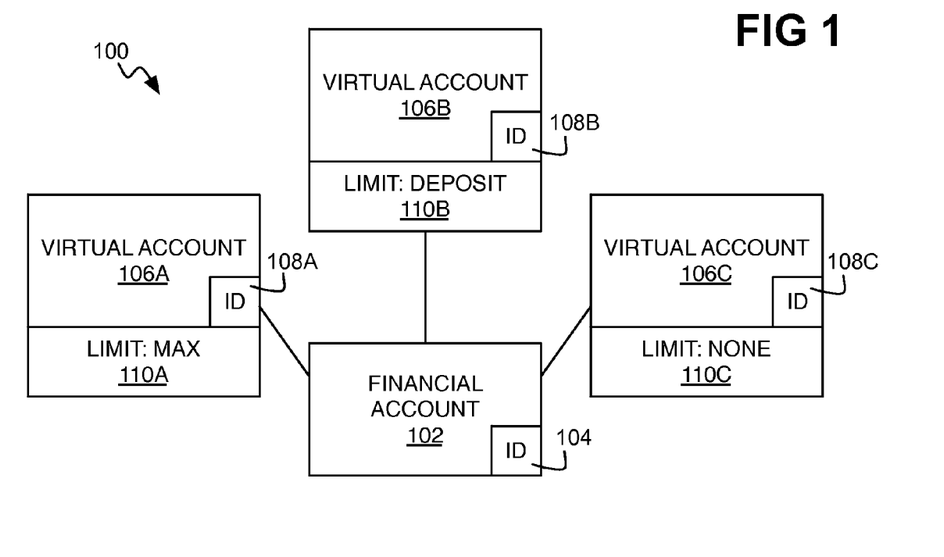
FIG. 1 is a diagram of a first example of a usage scenario of a virtual account, according to an embodiment of the invention.

FIG. 1 shows a first example usage scenario 100, according to an embodiment of the invention. The usage scenario 100 includes a financial account 102 that has an alphanumeric identifier 104 that uniquely identifies the account 102. For example, the financial account 102 may be a checking account. As such, the alphanumeric identifier 104 may include an account number that uniquely identifies the checking account at the financial institution at which the account is held, as well as a routing number that uniquely identifies the financial institution itself.

Three virtual accounts 106A, 106B, and 106C, which are collectively referred to as the virtual accounts 106, are linked to the financial account 102. The virtual accounts 106 also have alphanumeric identifiers 108A, 108B, and 108C, respectively, which are referred to as the alphanumeric identifiers 108. The alphanumeric identifiers 108 uniquely identify the virtual accounts 106, and further are different than one another and different than the alphanumeric identifier 104 of the financial account 102.

The virtual accounts 106 may each be of the same account type, or a different account type, as that of the financial account 102. For instance, the financial account 102 is a checking account in the example of FIG. 1. The virtual account 106A, by comparison, may be a credit card account or a debit card account. As such, the alphanumeric identifier 108A may specify a card number, an expiration date, and a three- or four-digit "secret" number. By comparison, the virtual accounts 106B and 106C may be checking accounts, and thus their alphanumeric identifiers 108B and 108C may have the same routing number as the alphanumeric identifier 104 of the financial account 102, but different account numbers.

The virtual accounts 106 also have limits 110A, 110B, and 110C, respectively, which are collectively referred to as the limits 110A. For example, the limit 110A of the virtual account 106A specifies a maximum daily amount that may be charged against the financial account 102 using the virtual account 106A. The holder of the financial account 102 may thus use the virtual account 106A for his or her regular and smaller purchases, knowing that if the virtual account 106A becomes compromised, the holder knows that if this fact is discovered within a day, that only the maximum daily amount can be stolen from the underlying financial account 102.

The limit 110B of the virtual account 106B may specify that the virtual account 106B can only be used for deposit purposes, and not for withdrawal or payment purposes. The holder of the financial account 102 may thus use the virtual account 106B to receive payment from payors. The holder knows that even if an unscrupulous payor tries to use the virtual account 106B to make a purchase, such a transaction will be declined as violating the limit 110B.

The limit 110C of the virtual account 106C may specify no restrictions on the utilization of the virtual account 106C. The holder of the financial account 102 may thus use the virtual account 106C sparingly, with particularly trusted parties and/or for unusually large purchases. An advantage of using the virtual account 106C instead of the financial account 102 directly, however, is that if the virtual account 106C does become compromised, the holder only has to obtain a new virtual account in replacement, instead of a new financial account.

Figure 2:
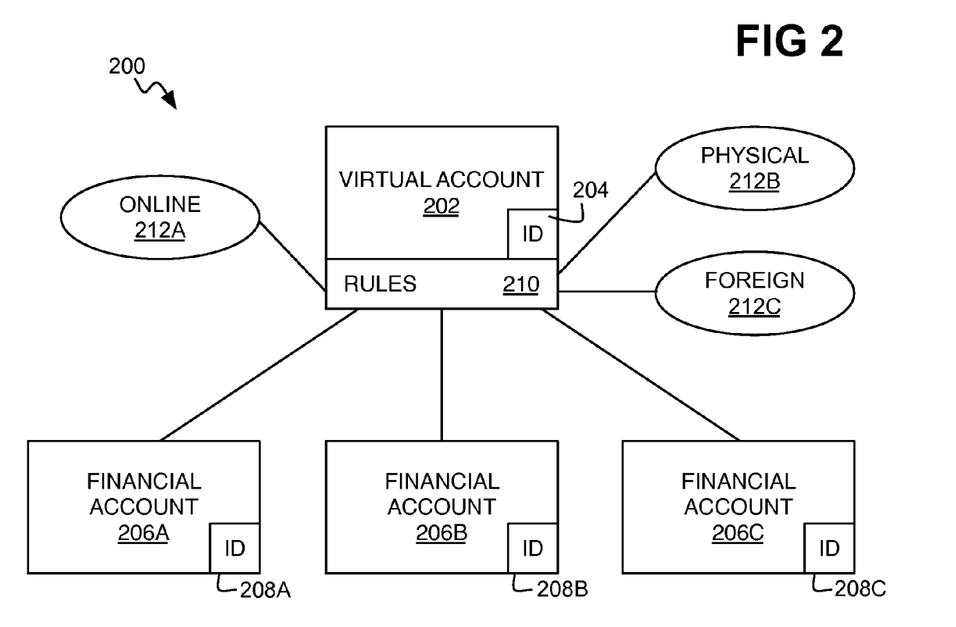
FIG. 2 is a diagram of a second example of a usage scenario of a virtual account, according to an embodiment of the invention.

FIG. 2 shows a second example usage scenario 200, according to an embodiment of the invention. The usage scenario 200 includes a virtual account 202 that has an alphanumeric identifier 204 that uniquely identifies the account 202. For example, the virtual account 202 may be a credit card account. The virtual account 202 is linked to three financial accounts 206A, 206B, and 206C, which are collectively referred to as the financial accounts 206. The financial accounts 206 likewise have alphanumeric identifiers 208A, 208B, and 208C, respectively, and which are collectively referred to as the alphanumeric identifiers 208.

The financial account 206A may be a credit card account, such that the virtual account 202 and the financial account 206A are of the same account type. The financial account 206B may also be a credit card account, such that the virtual account 202 and the financial account 206B are also of the same account type. The financial account 206C by comparison may be a checking account, meaning that the virtual account 202 and the financial account 206C are of different account types.

The virtual account 202 has a number of rules 210, which specify against which financial account 206 a financial transaction is to be processed when using the virtual account 202. For example, online purchases 212A made using the virtual account 202 may be processed against the financial account 206A. By comparison, in-person, or physical, purchases 212B made using the virtual account 202 may be processed against the financial account 206B. Foreign purchases 212C, or purchases that otherwise are denominated in foreign currency, made using the virtual account 202 may be processed against the financial account 206C. The holder of the financial accounts 206 is thus able to segment his or her purchases even when using the same virtual account 202 for all purchases.

Figure 3:
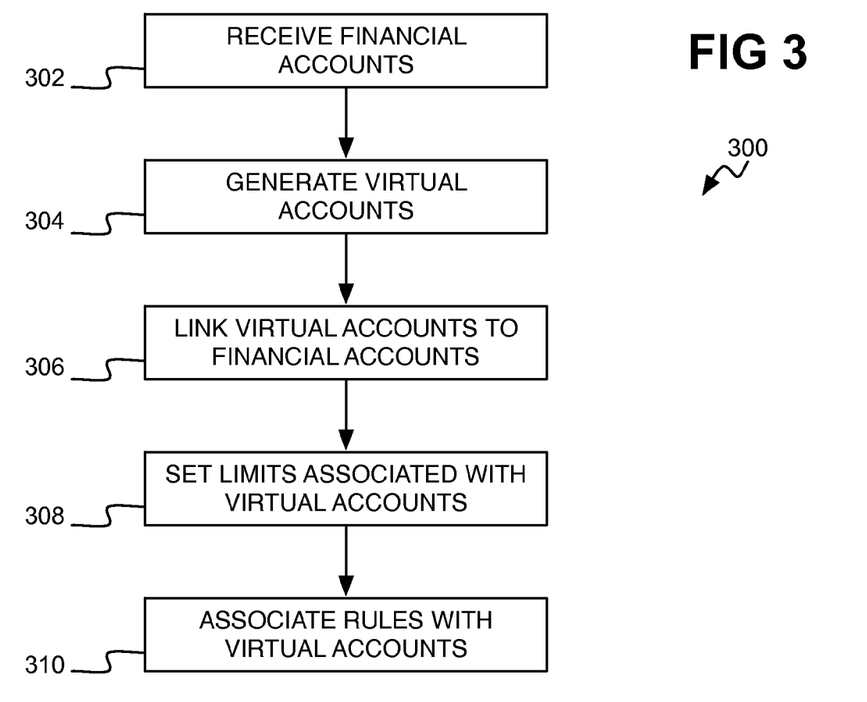
FIG. 3 is a flowchart of a method for creating a virtual account, according to an embodiment of the invention.

FIG. 3 shows a method 300, according to an embodiment of the invention. The method 300 can be performed by a processor of a computing device. As such, the method 300 can be implemented as a computer program stored on a computer-readable data storage medium. Execution of the method 300 by the processor thus performs the method 300.

Alphanumeric identifiers of one or more financial accounts are received (302). Each financial account is a real, as opposed to a virtual, financial account, that has a current monetary balance, which may be zero. Examples of financial accounts include checking accounts, savings accounts, money market accounts, investment accounts, credit card accounts, and other types of financial accounts. The alphanumeric identifiers may thus include account numbers, financial institution routing numbers, and/or other types of alphanumeric identifiers.

A monetary balance is more generally a value. As such, a financial account can include such accounts that have actual monetary balances, such as checking accounts, savings accounts, and so on, as noted above. However, a financial account can also include such accounts that have a value, but that do not have a monetary balance per se. For instance, a brokerage account, such as a retirement account, can include shares of stocks and/or bonds. The current number of shares may be considered the current value of the account, even if there is no current monetary balance of the account.

Virtual accounts are generated (304). Each virtual account has an alphanumeric identifier that is different from the alphanumeric identifier of the financial accounts. At least one virtual account may have an account type identical to an account type of one of the financial accounts, and at least one other virtual account may have an account type different than the account type of one of the financial accounts. Examples of account types include card-type accounts, banking accounts, and so on.

The virtual accounts are each linked to at least one of the financial accounts (306). As such, financial transactions performed in relation to each virtual account result in changing the current monetary balance of one of the accounts to which the virtual account is linked. The virtual accounts do not themselves have current monetary balances apart from the current monetary balance of each financial account to which the virtual accounts are linked. Performance of financial transactions in relation to a virtual account further does not expose the alphanumeric identifier of any financial account to which the virtual account is link, as would otherwise normally be exposed if the financial transactions were performed directly in relation to the financial account.

Limits associated with each virtual account may be set (308). As such, attempted performance of a financial transaction in relation to a virtual account does not succeed, and does not change the current monetary balance of any financial account to which the virtual account is linked, if the financial transaction violates the limit. The limits can include specifying that deposits can be made into a financial account to which a virtual account is linked, via the virtual account, but that payments or withdrawals cannot be made from this financial account via the virtual account.

The limits can similarly include specifying that withdrawals and payments can be made from a financial account to which a virtual account is linked, via the virtual account, but that deposits cannot be made into this financial account via the virtual account. The limits may further include a maximum amount of withdrawals or payments that can be made from a financial account to which a virtual account is linked, via the virtual account, on a per-transaction basis and/or on a per-time period basis. For example, a given financial transaction may not be permitted to exceed a given amount, and the transactions for a particular day may not be permitted to exceed the same or different amount.

For virtual accounts that are each linked to more than one financial account, rules may be associated with each such virtual account (310). When a financial transaction is presented to a virtual account that is linked to more than one financial account, one of the financial accounts is selected of which the current monetary balance is to change in accordance with the transaction. The rules can thus be evaluated to determine which financial account should be used for a particular transaction presented against the virtual account to which a number of virtual accounts are linked.

A first rule may specify that one of the financial accounts to which a virtual account is linked is a default financial account. As such, the current monetary balance is to change when a financial transaction is presented against the virtual account, if no other rule applies to the financial transaction. A second rule may specify that if the financial transaction involves an amount greater than a predetermined amount, a particular financial account to which the virtual account is linked is to be selected for its current monetary balance to change when the transaction is performed.

A third rule may specify that when a financial transaction relates to a particular merchant and/or a particular type of merchant, a particular financial account to which the virtual account is linked to is to be selected for its current monetary balance to change when the transaction is performed. As such, the same virtual account can be used at different merchants and/or different types of merchants, while the underlying financial accounts that are used to make such purchases can vary. A fourth rule can specify that when a financial transaction relates to a particular type of currency, such as foreign currency, a particular financial account to which the virtual account is linked is to be selected for its current monetary balance to change when the transaction is performed.

A fifth rule can specify that a particular financial account to which the virtual account is linked based on a parameter associated with each financial account. For instance, of all the financial accounts to which the virtual account is linked, a particular financial account that has a statement date farthest from the present date may be selected, to achieve a maximum amount of "float" for the financial transaction. As another example, of all the financial accounts to which the virtual account is linked, a particular financial account that has the most favorable exchange rate for a foreign currency in which the financial transaction is denominated may be selected.

Figure 4:
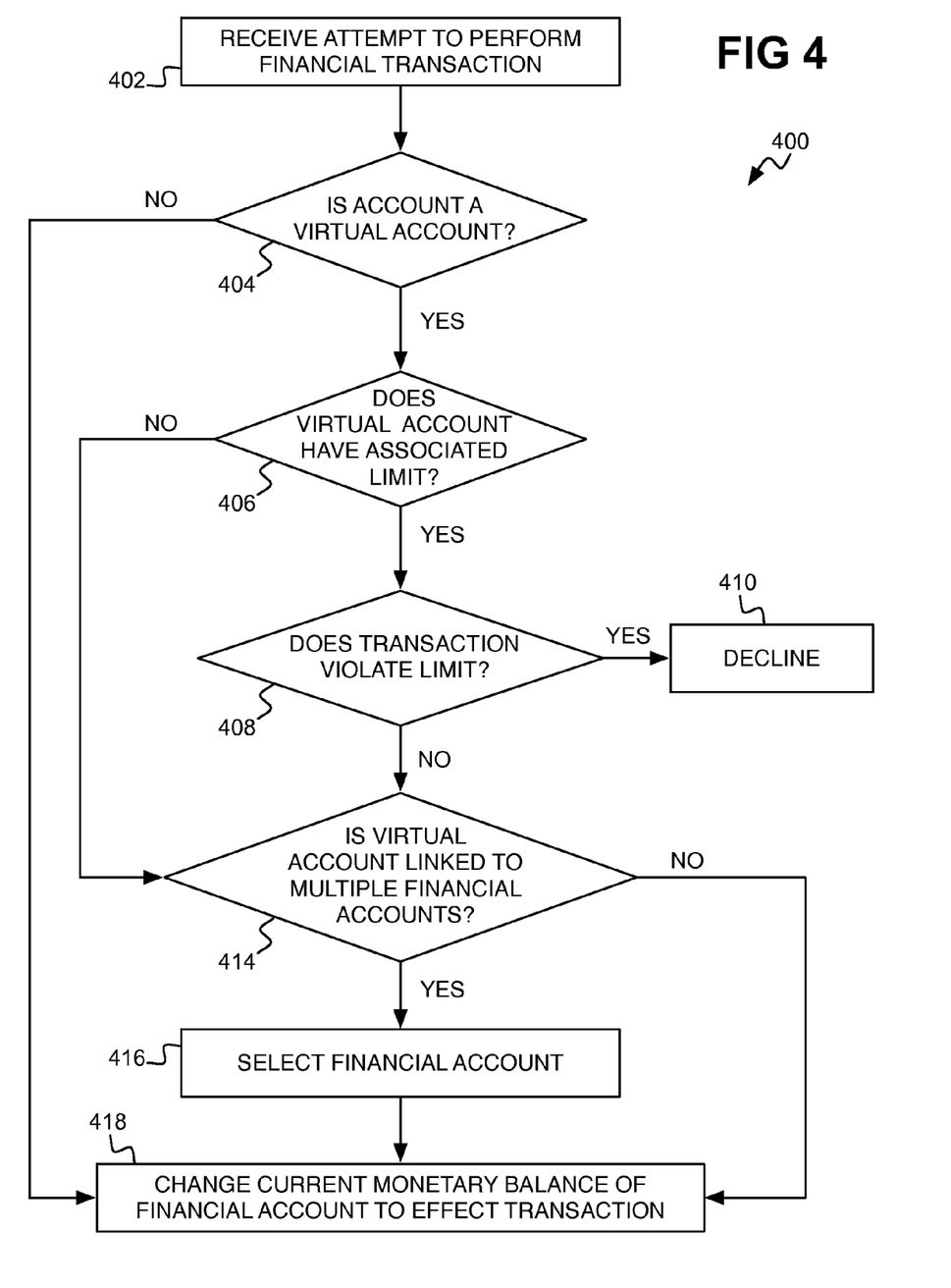
FIG. 4 is a flowchart of a method for using a virtual account, according to an embodiment of the invention.

FIG. 4 shows a method 400, according to another embodiment of the invention. As with the method 300 of FIG. 3, the method 400 can be performed by a processor of a computing device. As such, the method 400 can be implemented as a computer program stored on a computer-readable data storage medium. Execution of the method 400 by the processor thus performs the method 400.

An attempt to perform a financial transaction in relation to an account is received (402). For example, a credit card may have been presented by a consumer to make payment for goods or services using the credit card. As another example, a payor may have presented the alphanumeric identifier of the account to attempt to make payment to the account.

If the account is a virtual account (404), if the virtual account has an associated limit (406), and if the transaction violates the limit (408), then the financial transaction is declined (410). As such, the financial transaction is not performed. However, if the account is a virtual account (404), and if the virtual account does not have an associated limited (406), or if the virtual account has an associated limit (406) but the financial transaction does not violate this limit (408), and if the virtual account is linked to multiple financial accounts (414), then one of these financial accounts is selected (416). The current monetary balance of the selected financial account is thus changed to effect the financial transaction (418). For instance, if the financial transaction is a withdrawal or a purchase, then the current monetary balance is decremented by the amount of the transaction, whereas if the financial transaction is a deposit, then the current monetary balance is incremented by the amount of the transaction.

Likewise, if the account is a virtual account (404), and if the virtual account does not have an associated limit (406), or if the virtual account has an associated limit (406) but the financial transaction does not violate this limit (408), and if the virtual account is linked to just one financial account (414), then the current monetary balance of this financial account is changed to effect the transaction (418). Similarly, if the account is not a virtual account (404), then the current monetary balance of this financial account is changed to effect the transaction (418). The method 400 thus permits a consumer to use a virtual account to perform a financial transaction, where the current monetary balance of an underlying financial account is changed to effect the transaction. The virtual account may or may not have a limit, and may be linked to one financial account or to more than one financial account.

Figure 5:
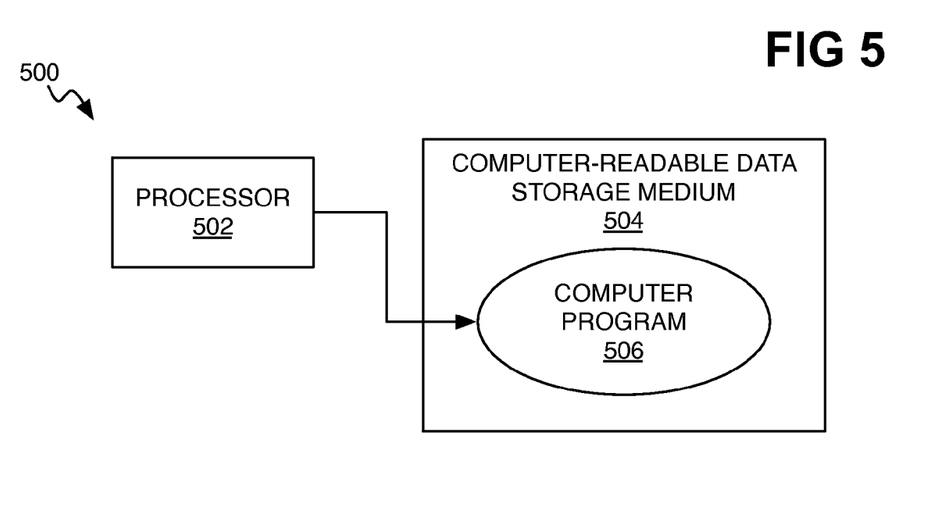
FIG. 5 is a diagram of a system, according to an embodiment of the invention.

FIG. 5 shows a rudimentary system 500, according to an embodiment of the invention. The system 500 may be implemented over one or more computing devices. As such, the system 500 includes a processor 502 and a computer-readable data storage medium 504. The computer-readable data storage medium 504 stores a computer program 506. Execution of the computer program 506 from the computer-readable data storage medium 504 causes the system 500 to perform the functionality of the method 300 and/or the method 400 that have been described.

Figure 6A:
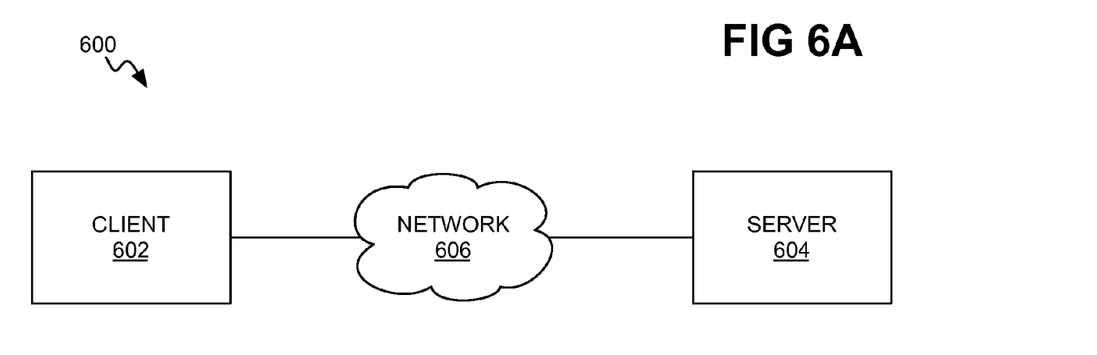
FIGS. 6A and 6B are diagrams of network topologies in relation to which the system of FIG. 5 can be implemented, according to different embodiments of the invention.
Figure 6B:
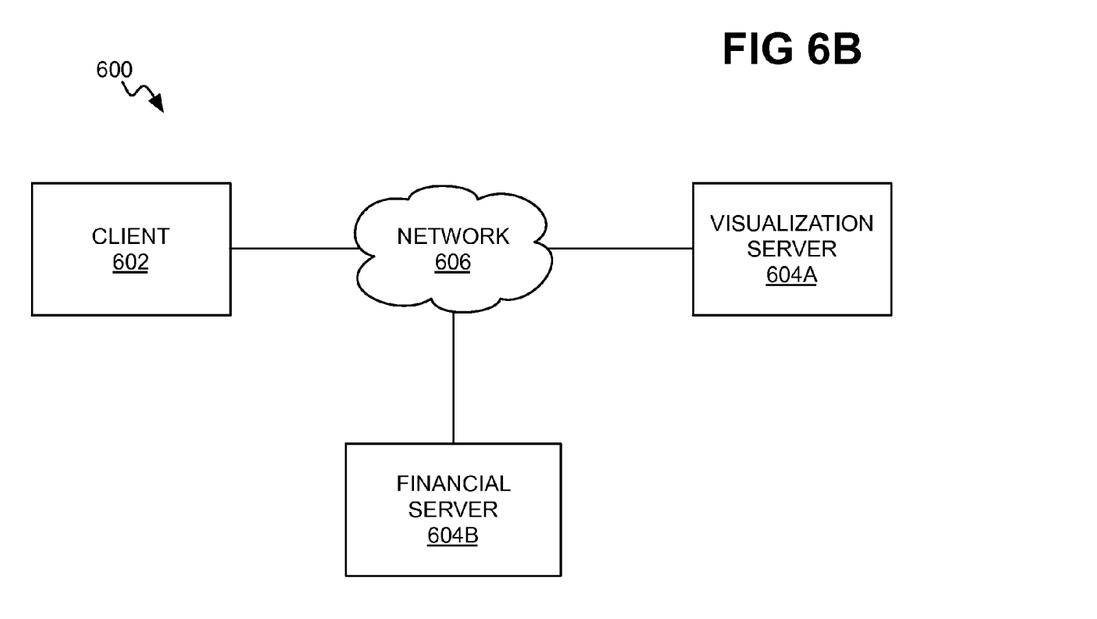

The system 500 can be implemented in a wide variety of different network topologies, or architectures. FIGS. 6A and 6B show two different such topologies 600, according to different embodiments of the invention. In FIG. 6A, there is a client 602 that is communicatively connected to a server 604 over a network 606. The network 606 may be or included wired and/or wireless networks, intranets, extranets, telephony networks, local-area networks, wide-area networks, the Internet, and/or other types of networks.

The client 602 may be a computing device of an end user that holds the financial accounts. For instance, the client 602 may be a desktop or a laptop computer, a tablet computing device, a mobile phone-type computing device, and so on. The client 602 may alternatively be a computing device of a retailer that is processing a transaction on behalf of the end user that holds the financial accounts. In this respect, too, the client 602 may be a desktop or a laptop computer, a tablet computing device, a mobile phone-type computing device, as well as a point-of-sale (POS) terminal or device, and so on. What is represented as the client 602 in FIG. 6A may include both of these types of devices as well.

In FIG. 6A, what is represented is the server 604 can be or include one or more computing devices that performs the methods 300 and 400 of FIGS. 3 and 4 that have been described. For instance, the server 604 may be a single computing device. Alternatively, the server 604 may be more than one computing device that interact with one another to perform the methods 300 and 400. It is contemplated that a single entity, such as a single bank or other financial institution, controls the server 604 in the embodiment of FIG. 6A, and as such, maintains both the virtual accounts for the end user, as well as the actual financial accounts for the end user.

By comparison, in FIG. 6B, while the client 602 and the network 606 are as in FIG. 6A, the server 604 of FIG. 6A has been bifurcated into two server devices: a virtualization server 604A and a financial server 604B. As in FIG. 6A, however, each of the servers 604A and 604B can in actuality be more than one computing device that performs particular functionality. However, the server 604 of FIG. 6A is divided into two servers 604A and 604B to convey that the entity that controls the server 604A is different than the entity that controls the server 604B.

For instance, the virtualization server 604A may be controlled by an entity that provides for and maintains the virtual accounts for the end user. As such, the virtualization server 604A performs the method 300 of FIG. 3, as well as the method 400 of FIG. 4 except for part 418 thereof. By comparison, the financial server 604B may be controlled by an entity (or entities) that maintain the actual financial accounts for the end user. As such, the financial server 604B performs part 418 of the method 400, as directed by the virtualization server 604A.

Consider, for example, a situation in which an end user has a number of different financial accounts, maintained by different financial institutions. Each financial institution thus has or maintains a corresponding financial server 604B. However, to link these different financial accounts with one or more different virtual accounts, the end user employs the services of a potentially different entity that controls the virtualization server 604A. In this respect, then, the end user is not limited to virtual account services provided by his or her financial institutions in the example of FIG. 6B, as may be the case in the example of FIG. 6A. Furthermore, the end user is not limited to having a virtual account that is linked to just his or her financial accounts maintained by the same financial institution.

While FIGS. 6A and 6B show two different example topologies in relation to which embodiments of the invention can be implemented, other embodiments are not so limited. Rather, FIGS. 6A and 6B serve to show two particular scenarios in which embodiments of the invention can be implemented. In FIG. 6A, the entity that maintains the financial accounts of an end user is also likely the entity that maintains the virtual accounts of this end user. By comparison, in FIG. 6B, the entity or entities that maintain the financial accounts of an end user is likely different than the entity that maintains the virtual accounts of this end user.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

I claim:

1. A computer-readable data storage medium storing a computer program executable by a processor of a virtualization server, execution of the computer program by the processor causing a method to be performed, the method comprising:

receiving, by the virtualization server, an alphanumeric identifier of a financial account having a current value, the financial account maintained by a financial institution at a financial server different than the virtualization server;

generating, by the virtualization server, a plurality of virtual accounts, each virtual account having an alphanumeric identifier different from the alphanumeric identifier of the financial account;

linking, by the virtualization server, the virtual accounts to the financial account, financial transactions performed in relation to the virtual accounts resulting in changing the current value of the financial account;

receiving, by the virtualization server, an attempt to perform a financial transaction in relation to a selected virtual account of the virtual accounts at a retailer computing device over the Internet, the retailer computing device receiving an alphanumeric identifier of the selected virtual account when the financial transaction is attempted to be performed; and causing, by the virtual server, the financial transaction to be performed in relation to the financial account, the financial account having an alphanumeric identifier different than the alphanumeric identifier of the virtual account received by the retailer computing device, the alphanumeric identifier of the financial account not exposed to the retailer computing device and that would otherwise be exposed if the financial transaction were performed in relation to the financial account directly, the financial transaction being performed without the alphanumeric identifier of the selected financial account being exposed to the retailer computing device preventing interception of the alphanumeric numeric identifier of the financial account over the Internet, wherein the virtual accounts themselves do not have a current value apart from the current value of the financial account to which the virtual accounts are linked, and wherein at least one virtual account has an account type identical to an account type of the financial account, and at least one other virtual account has an account type different than the account type of the financial account.

2. The computer-readable data storage medium of claim 1, wherein the method further comprises, for a given virtual account of the virtual machines, setting a limit associated with the given virtual account but not with the financial account, and wherein attempted performance of a financial transaction in relation to the given virtual account does not succeed and does not change the current value of the financial account if the financial transaction violates the limit.

3. The computer-readable data storage medium of claim 2, wherein the limit provides one of:

that deposits can be made into the financial account via the given virtual account but that withdrawals and payments cannot be made from the financial account via the given virtual account; and, that withdrawals and payments can be made from the financial account via the given virtual account but that deposits cannot be made into the financial account via the given virtual account.

4. The computer-readable data storage medium of claim 2, wherein the limit provides one of:

a maximum amount of a withdrawal or a payment that can be made from the financial account via the given virtual account on a per-financial transaction basis; and, a maximum amount of withdrawals or payments that can be made from the financial account via the given virtual account on a per-time period basis.

5. The computer-readable data storage medium of claim 1, wherein the financial account is a first financial account, and wherein the method further comprises:

receiving an alphanumeric identifier of a second financial account having a current value;

linking a given virtual account of the virtual accounts to the second financial account, the given virtual account linked to both the first financial account and the second financial account, and wherein performance of a financial transaction in relation to the given virtual account results in changing the current value of one of the first financial account and the second financial account.

6. The computer-readable data storage medium of claim 5, wherein the method further comprises associating one or more rules with the given virtual account, wherein the one or more rules are evaluated when the financial transaction is performed in relation to the given virtual account to determine whether the current value of the first financial account or the current value of the second financial account is to be changed as a result of the performance of the financial transaction.

7. The computer-readable data storage medium of claim 6, wherein the rules comprise one or more of:

a first rule specifying that one of the first financial account and the second financial account is a default financial account of which the current value is to be changed as a result of the performance of the financial transaction when no other rule applies to the financial transaction;

a second rule specifying that when the financial transaction involves an amount greater than a predetermined amount, the current value of a particular one of the first financial account and the second financial account is to be changed as a result of the performance of the financial transaction;

a third rule specifying that when the financial transaction relates to one of a particular merchant and a particular type of merchant, the current value of a particular one of the first financial account and the second financial account is to be changed as a result of the performance of the financial transaction;

a fourth rule specifying that when the financial transaction relates to a particular type of currency, the current value of a particular one of the first financial account and the second financial account is to be changed as a result of the performance of the financial transaction;

a fifth rule specifying that a particular one of the first financial account and the second financial account is to be changed as a result of the performance of the financial transaction, based on a parameter of each of the first financial account and the second financial account, the parameter being one of a statement date and a foreign currency exchange rate.

8. The computer-readable data storage medium of claim 1, wherein the financial account is one of: a checking account, a savings account, a money market account, an investment account, and a credit card account.

9. The computer-readable data storage medium of claim 1, wherein the alphanumeric identifier of the financial account comprises one or more of: an account number, and a financial institution routing number.

10. A method comprising:
receiving, by a processor of a virtualization server, an attempt to perform a financial transaction in relation to an account at a point-of-sale (POS) terminal device, the POS terminal device receiving an alphanumeric identifier of the account when the financial transaction is being attempted to be performed;
in response to determining that the account is a virtual account linked to a first financial account having a current value and to a second financial account having a current value, the first financial account and the second financial account maintained by one or more financial institutions at one or more financial servers different than the virtualization server,
selecting, by the processor of the virtualization server, a selected financial account from at least the first financial account and the second financial account based on the financial transaction, the selected financial account having an alphanumeric identifier different than the alphanumeric identifier of the virtual account received by the POS terminal device, the alphanumeric identifier of the selected financial account not exposed to the POS terminal device and that would otherwise be exposed if the financial transaction were performed in relation to the selected financial account directly; and
directing, by the processor of the virtualization server, one of the one or more financial servers to change the current value of the selected financial account to effectuate performance of the financial transaction, the financial transaction being performed without the alphanumeric identifier of the selected financial account being exposed to the POS terminal device preventing skimming of the alphanumeric identifier of the selected financial account at the POS terminal device,
wherein the virtual account itself does not have a current value apart from the current value of the first financial account and the current value of the second financial account to which the virtual account is linked.

11. The method of claim 10, further comprising, in response to determining that the financial transaction violates a limit associated with the account, declining, by the processor, the financial transaction so the financial transaction is not performed.

12. The method of claim 11, wherein the limit provides one or more of:
that deposits can be made into the financial account via the given virtual account but that withdrawals and payments cannot be made from the financial account via the given virtual account;
that withdrawals and payments can be made from the financial account via the given virtual account but that deposits cannot be made into the financial account via the given virtual account;
a maximum amount of a withdrawal or a payment that can be made from the financial account via the given virtual account on a per-financial transaction basis; and,
a maximum amount of withdrawals or payments that can be made from the financial account via the given virtual account on a per-time period basis.

13. The method of claim 10, wherein selecting the selected financial account based on the financial transaction comprises evaluating one or more rules associated with the given virtual account to determine, and wherein the rules comprise one or more of:
a first rule specifying that one of the first financial account and the second financial account is a default financial account of which the current value is to be changed as a result of the performance of the financial transaction when no other rule applies to the financial transaction;
a second rule specifying that when the financial transaction involves an amount greater than a predetermined amount, the current value of a particular one of the first financial account and the second financial account is to be changed as a result of the performance of the financial transaction;
a third rule specifying that when the financial transaction relates to one of a particular merchant and a particular type of merchant, the current value of a particular one of the first financial account and the second financial account is to be changed as a result of the performance of the financial transaction;
a fourth rule specifying that when the financial transaction relates to a particular type of currency, the current value of a particular one of the first financial account and the second financial account is to be changed as a result of the performance of the financial transaction; and,
a fifth rule specifying that a particular one of the first financial account and the second financial account is to be changed as a result of the performance of the financial transaction, based on a parameter of each of the first financial account and the second financial account, the parameter being one of a statement date and a foreign currency exchange rate.

14. The method of claim 10, wherein the financial account is one of: a checking account, a savings account, a money market account, an investment account, and a credit card account.

15. The method of claim 10, wherein the alphanumeric identifier of the financial account comprises one or more of: an account number, and a financial institution routing number.

16. A virtualization server comprising:
a processor;
a computer-readable data storage medium storing a computer program executable by the processor to:
receive an alphanumeric identifier of a financial account having a current value, the financial account maintained by a financial institution at a financial server different than the virtualization server;
generate a plurality of virtual accounts, each virtual account having an alphanumeric identifier different from the alphanumeric identifier of the financial account; and
link the virtual accounts to the financial account, financial transactions performed in relation to the virtual accounts resulting in changing the current value of the financial account;
receive an attempt to perform a financial transaction in relation to a selected virtual account of the virtual accounts at a retailer computing device, the retailer computing device receiving an alphanumeric identifier of the selected virtual account when the financial transaction is attempted to be performed;

cause the financial transaction to be performed in relation to the financial account, the financial account having an alphanumeric identifier different than the alphanumeric identifier of the virtual account received by the retailer computing device, the alphanumeric identifier of the financial account not exposed to the retailer computing device and that would otherwise be exposed if the financial transaction were performed in relation to the financial account directly, the financial transaction being performed without the alphanumeric identifier of the selected financial account being exposed to the retailer computing device preventing skimming of the alphanumeric identifier of the financial account at the retailer computing device and preventing interception of the alphanumeric identifier of the financial account over the Internet, wherein the virtual accounts themselves do not have a current value apart from the current value of the financial account to which the virtual accounts are linked, and wherein at least one virtual account has an account type identical to an account type of the financial account, and at least one other virtual account has an account type different the the account type of the financial account.

17. The virtualization server of claim 16, wherein the computer program is executable by the processor further to, for a given virtual account of the virtual machines, set a limit associated with the given virtual account but not with the financial account, and wherein attempted performance of a financial transaction in relation to the given virtual account does not succeed and does not change the current value of the financial account if the financial transaction violates the limit.

18. The virtualization server of claim 17, wherein the limit provides one or more of:

that deposits can be made into the financial account via the given virtual account but that withdrawals and payments cannot be made from the financial account via the given virtual account;

that withdrawals and payments can be made from the financial account via the given virtual account but that deposits cannot be made into the financial account via the given virtual account;

a maximum amount of a withdrawal or a payment that can be made from the financial account via the given virtual account on a per-financial transaction basis; and, a maximum amount of withdrawals or payments that can be made from the financial account via the given virtual account on a per-time period basis.

19. The virtualization server of claim 16, wherein the financial account is a first financial account, and wherein the computer program is executable by the processor further to:

receive an alphanumeric identifier of a second financial account having a current value;

link a given virtual account of the virtual accounts to the second financial account, the given virtual account linked to both the first financial account and the second financial account, wherein performance of a financial transaction in relation to the given virtual account results in changing the current value of one of the first financial account and the second financial account.

20. The virtualization server of claim 19, wherein the computer program is executable by the processor further to associate one or more rules with the given virtual account, wherein the one or more rules are evaluated when the financial transaction is performed in relation to the given virtual account to determine whether the current value of the first financial account or the current value of the second financial account is to be changed as a result of the performance of the financial transaction, and wherein the rules comprise one or more of:

a first rule specifying that one of the first financial account and the second financial account is a default financial account of which the current value is to be changed as a result of the performance of the financial transaction when no other rule applies to the financial transaction;

a second rule specifying that when the financial transaction involves an amount greater than a predetermined amount, the current value of a particular one of the first financial account and the second financial account is to be changed as a result of the performance of the financial transaction;

a third rule specifying that when the financial transaction relates to one of a particular merchant and a particular type of merchant, the current value of a particular one of the first financial account and the second financial account is to be changed as a result of the performance of the financial transaction;

a fourth rule specifying that when the financial transaction relates to a particular type of currency, the current value of a particular one of the first financial account and the second financial account is to be changed as a result of the performance of the financial transaction; and, a fifth rule specifying that a particular one of the first financial account and the second financial account is to be changed as a result of the performance of the financial transaction, based on a parameter of each of the first financial account and the second financial account, the parameter being one of a statement date and a foreign currency exchange rate.

\* \* \* \* \*